United States Patent
Bando

[19]

[11] Patent Number: 5,857,398
[45] Date of Patent: *Jan. 12, 1999

[54] GLASS PLATE CUTTING DEVICE

[75] Inventor: Shigeru Bando, Tokushima, Japan

[73] Assignee: Bando Kiko, Ltd., Tokushima, Japan

[ * ] Notice: The term of this patent shall not extend beyond the expiration date of Pat. No. 5,398,575.

[21] Appl. No.: 365,792

[22] Filed: Dec. 29, 1994

Related U.S. Application Data

[62] Division of Ser. No. 146,158, filed as PCT/JP93/00475 Apr. 14, 1993, Pat. No. 5,398,579.

[30] Foreign Application Priority Data

Apr. 16, 1992 [JP] Japan ..................................... 4-124348
Mar. 23, 1993 [JP] Japan ..................................... 5-88045

[51] Int. Cl.⁶ ...................................................... B26D 3/08
[52] U.S. Cl. .............................................. 83/879; 83/940
[58] Field of Search ..................................... 83/76.1, 76.6, 83/76.7, 76.8, 76.9, 487, 614, 879, 886, 939, 940, 941, 956; 33/1 M

[56] References Cited

U.S. PATENT DOCUMENTS

| | | | |
|---|---|---|---|
| 3,978,748 | 9/1976 | Leslie et al. | 83/177 X |
| 4,143,571 | 3/1979 | Oxenham | 83/552 X |
| 4,698,088 | 10/1987 | Bando | 225/96.5 X |
| 4,728,379 | 3/1988 | Audi et al. | 83/177 X |
| 4,736,661 | 4/1988 | Shirai | 83/882 |
| 4,787,178 | 11/1988 | Morgan et al. | 83/177 X |
| 5,221,034 | 6/1993 | Bando | 225/96.5 |
| 5,301,867 | 4/1994 | Bando | 225/96.5 X |
| 5,311,790 | 5/1994 | Yanagisawa | 74/490.09 |
| 5,355,744 | 10/1994 | Yanagisawa | 74/490.09 |
| 5,396,736 | 3/1995 | Bando | 451/70 X |
| 5,398,579 | 3/1995 | Bando | 83/879 |
| 5,400,939 | 3/1995 | Bando | 225/96.5 X |
| 5,409,417 | 4/1995 | Bando | 451/5 X |
| 5,413,263 | 5/1995 | Bando | 225/96.5 |
| 5,415,581 | 5/1995 | Bando | 451/67 |
| 5,616,064 | 4/1997 | Bando | 225/96.5 X |

FOREIGN PATENT DOCUMENTS

| | | |
|---|---|---|
| 0140794 | 5/1985 | European Pat. Off. . |
| 0217658 | 4/1987 | European Pat. Off. . |
| 0465675 | 1/1992 | European Pat. Off. . |
| 29-6140 | 9/1954 | Japan . |
| 45-752 | 1/1970 | Japan . |
| 1-122043 | 8/1989 | Japan . |
| 3-75496 | 12/1991 | Japan . |

*Primary Examiner*—M. Rachuba
*Attorney, Agent, or Firm*—Nixon & Vanderhye

[57] ABSTRACT

A glass plate cutting device 1 with a bridge frame 4 supported at its opposite ends 5 and 6 so as to be movable in a Y direction. The bridge frame 4 has an X direction linearly moving unit 3 for moving a cutter head 2 linearly in the X direction. Ball screw nuts 7 and 8 are attached rotatably to the corresponding ends 5 and 6 of the bridge frame 4. Ball screws 9 and 10 extend in the Y direction and are screwed in the corresponding nuts 7 and 8. Y direction linearly moving units 11 synchronously rotate the corresponding nuts 7 and 8 to move the bridge frame 4 in the Y direction. A further ball screw 12 extending in the X direction is provided on the bridge frame 4. A further ball screw 12 is screwed in the further ball screw nut 13 attached to an X direction linearly moving unit 3, whereby the further ball screw 13 is rotated by the X direction linearly moving unit 3 to move the cutter head 2 linearly in the X direction.

10 Claims, 5 Drawing Sheets

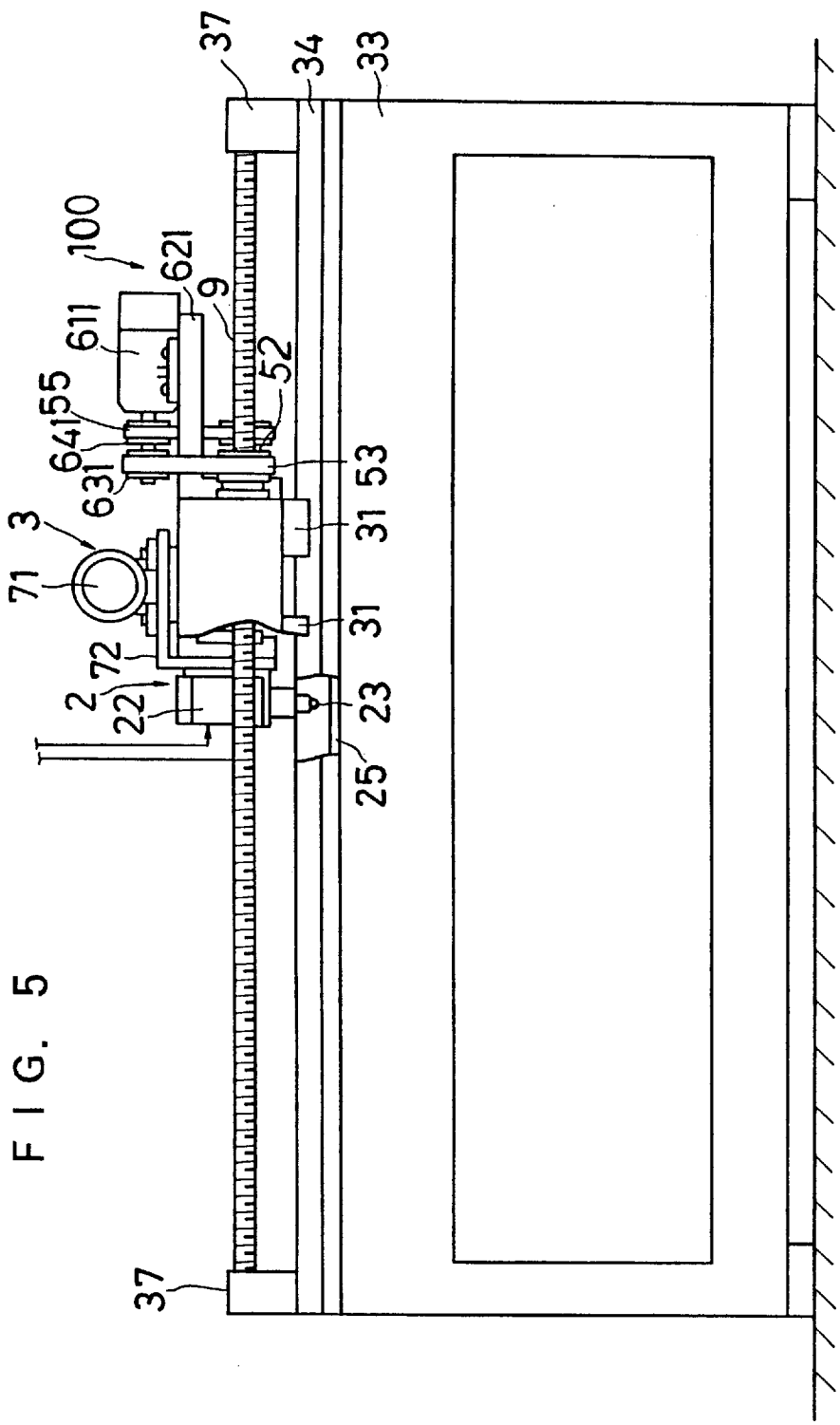

& # x 2 0 ;

GLASS PLATE CUTTING DEVICE

This is a Rule 60 Divisional of applicaiton Ser. No. 08/196,158, filed as PCT/JP93/00475 Apr. 14, 1993, now U.S. Pat. No. 5,398,579.

TECHNICAL FIELD

The present invention relates to glass plate cutting devices.

BACKGROUND ART

In a conventional glass plate cutting device, that is, in a breaking line forming device, a threaded shaft is connected to a moving base to which a cutter head is mounted and also connected through a pulley, a belt, etc., to a rotational output shaft of an electric motor, which is rotated and hence the threaded shaft is rotated to move the moving base, for example, in the direction of X. A threaded shaft is connected through a nut to a bed on which a glass plate is placed. The threaded shaft is connected through a pulley, a belt, etc., to the rotational output shaft of an electric motor, which is rotated and hence the threaded shaft is rotated to move the base, for example, in the direction of Y. Thus, a cutter wheel of the cutter head is moved along a cutting or breaking line to be formed on the glass plate.

In this conventional apparatus, the relatively long threaded shaft is rotated, so that large bending vibrations occur on the threaded shaft in a dangerous speed region. Thus, it is difficult to rotate the threaded shaft at high speed to move the moving base and bed at high speed to thereby improve the working efficiency.

The present invention is made in view of the above problems. It is an object of the present invention to provide a glass plate cutting device which is capable of moving the cutter head at high speed and accurately along a cutting line to be applied on a plate of glass, improving the working efficiency and providing a high quality product.

DISCLOSURE OF THE INVENTION

According to the present invention, the above objects are achieved by a glass plate cutting device including a bridge frame supported at its opposite ends so as to be movable in a Y direction, the bridge frame having an X direction linearly moving means for moving a cutter head linearly in the X direction, a pair of ball screw nuts each attached rotatably to a respective one of both ends of the bridge frame, a pair of ball screws extending in a Y direction with each ball screw being screwed in a respective one of the ball screws, and Y direction linearly moving means for synchronously rotating both the nuts to move the bridge frame in the Y direction.

According to the present invention, the above objects are also achieved by a glass plate cutting device including a bridge frame supported at its opposite ends so as to be movable in a Y direction, the bridge frame having an X direction linearly moving means for moving a cutter head linearly in the X direction, a pair of ball screw nuts each attached rotatably to a respective one of both ends of the bridge frame, a pair of ball screws extending in the Y direction with each ball screw being screwed in a respective one of the ball screws, and Y direction linearly moving means common to both the ball screw nuts for synchronously rotating both the nuts to move the bridge frame in the Y direction.

In the present glass plate cutting device, the Y direction linearly moving means rotates both the ball screw nuts synchronously to thereby move the bridge frame in the Y direction while the X direction linearly moving means moves the cutter head in the X direction. The cutter head is moved at high speed in an X-Y plane along the configuration of the glass plate on which a cutting line is formed.

According to the present invention, the above objects are achieved by the above glass plate cutting device which includes a further ball screw extending in the X direction provided on the bridge frame, a further ball screw nut screwed over the further ball screw and attached rotatably to the X direction linearly moving means, whereby the further ball screw is rotated by the X direction linearly moving means to move the cutter head in the X direction.

According to the present invention, the above objects are achieved by a glass plate cutting device including a bridge frame which supports a cutter head and supported at opposite ends of the bridge frame so as to be movable in the Y direction, a pair of ball screw nuts each attached rotatably to a respective one of both the ends of the bridge frame and a pair of ball screws extending in the Y direction with each ball screw being screwed in a respective one of the nuts, and Y direction linearly moving means for synchronously rotating both the nuts to move the bridge frame in the Y direction.

According to the present invention, the above objects are achieved by a glass plate cutting device including a bridge frame which supports a clutter head and supported at opposite ends of the frame so as to be movable in the Y direction, a pair of ball screw nuts each attached rotatably to a respective one of both the ends of the bridge frame, a pair of ball screws extending in the Y direction with each ball screw being screwed in a respective one of the nuts, and Y direction linearly moving means common to both the ball screw nuts for synchronously rotating both the nuts to move the bridge frame in the Y direction.

According to the present invention, the Y direction linearly moving means which rotates both the ball screw nuts synchronously to move the bridge frame linearly in the Y direction is provided. Thus, the cutter head is moved at high speed in the Y direction. Since both ends of the bridge frame are moved synchronously, the clutter head is moved accurately in the Y direction. Maintenance and adjustment are made simply in a short time, the working efficiency is improved, and high quality products are obtained.

The present invention will be described with respect to preferred embodiments thereof shown in the drawings. The present invention is not limited to those embodiments.

BRIEF DESCRTPTION OF THE DRAWINGS

FIG. 5 is a front view of the embodiment of FIG. 4.

EMBODIMENTS

Figure 1:
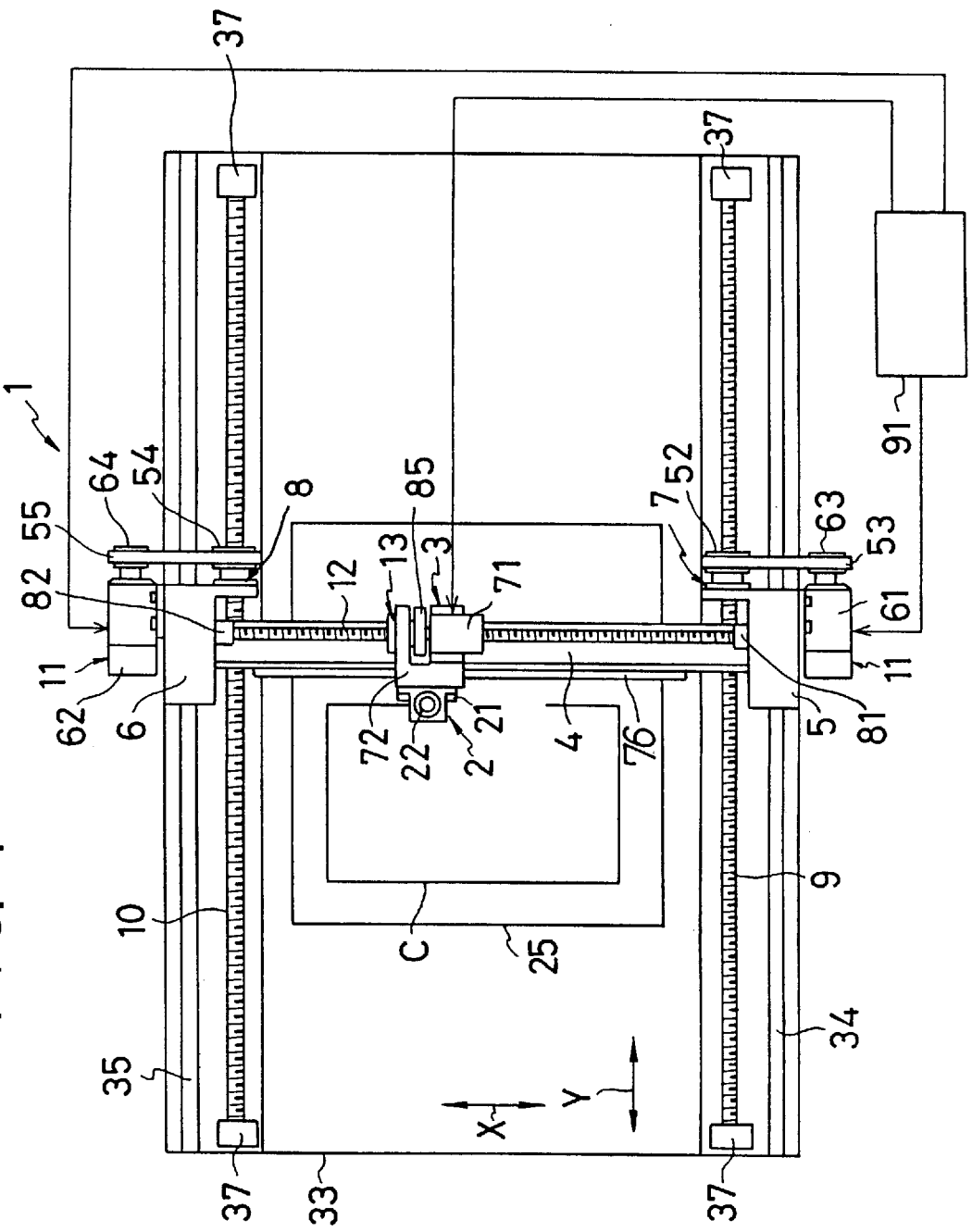
FIG. 1 is a plan view of a preferred embodiment of the present invention.
Figure 2:
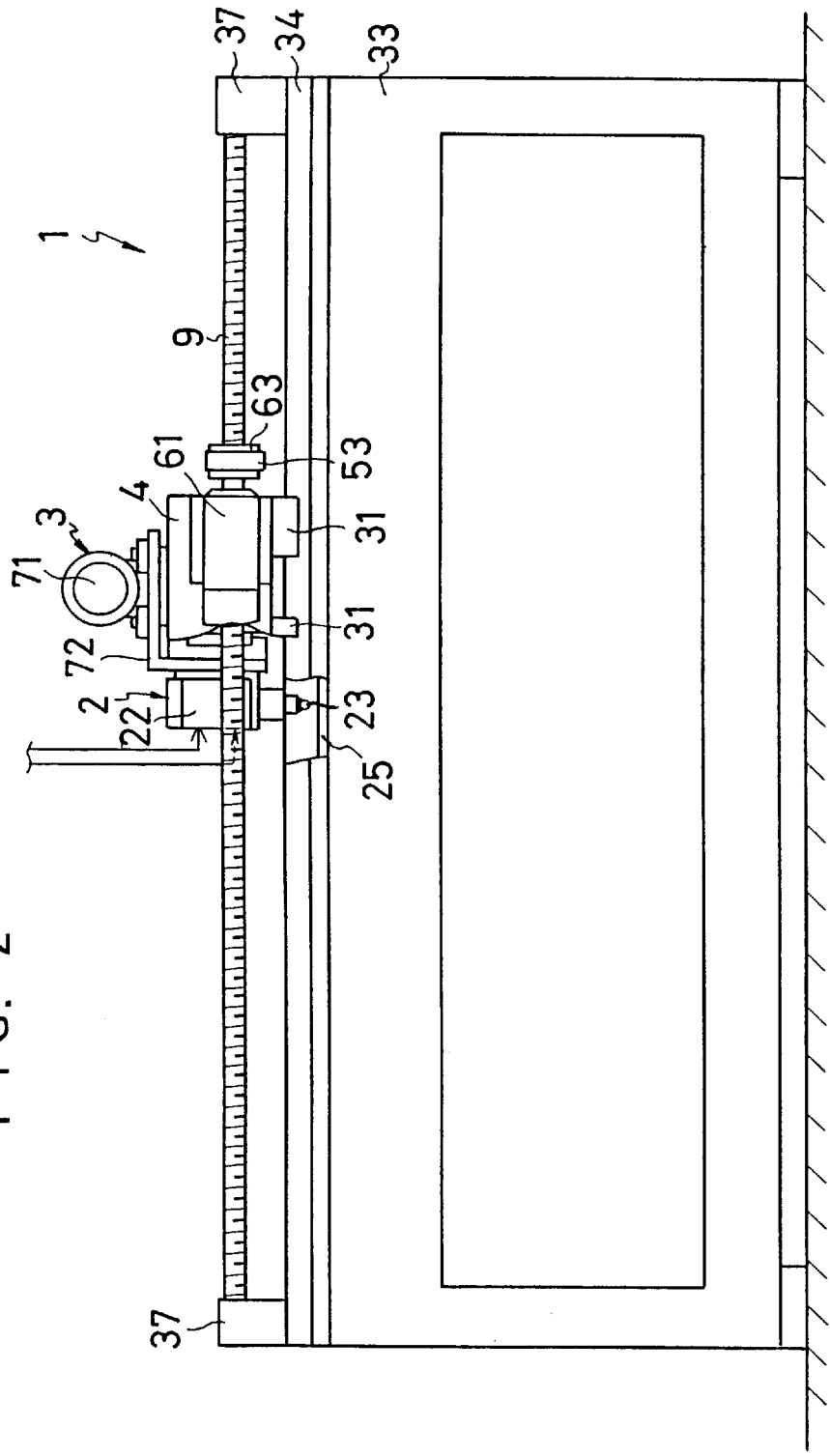
FIG. 2 is a front view of the embodiment of FIG. 1.
Figure 3:
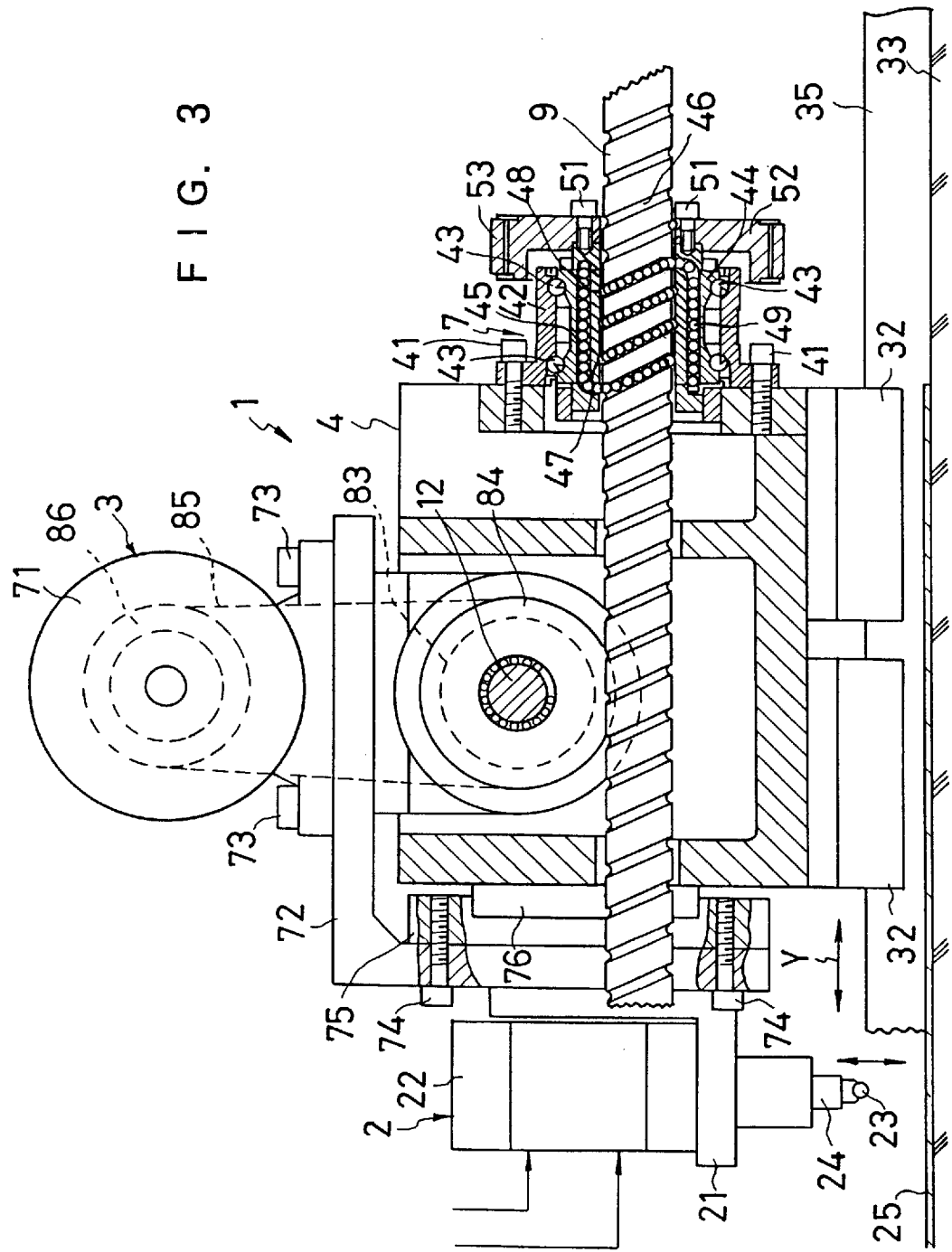
FIG. 3 is a cross-sectional view of the details of a part of the embodiment of FIG. 1.

In the Figures, the glass plate cutting device 1 of the first embodiment includes a bridge frame 4 mounted at its opposite ends 5 and 6 such that the frame 4 is movable in the Y direction. The bridge frame 4 mounts thereon an X direction linearly moving unit 3 which moves a cutter head 2 linearly in the X direction. Both the ends 5 and 6 of the frame 4 have ball screw nuts 7 and 8, respectively, attached rotatably thereto. Ball screws 9 and 10 extending in the Y direction are screwed in the nuts 7 and 8, respectively. Y direction linearly moving units 11 synchronously rotate the corresponding ball screw nuts 7 and 8 to move the bridge frame 4 linearly in the Y direction. A further ball screw 12 extending in the X direction is provided on the bridge frame 4. A further ball screw nut 13 which is screwed over the ball screw 12 is attached rotatably to the X direction linearly moving unit 3 such that the X direction linearly moving unit 3 rotates the ball screw nut 13 to move the cutter head 2 linearly in the X direction.

The cutter head 2 is provided with an air pressing means. Such air pressing means may include an air cylinder 22 attached to a bracket 21, and a cutter block 24 with a cutter wheel 23 and attached to a piston rod of the air cylinder 22. By feeding/releasing pressurized air to/from the air cylinder 22, the cutter block 24 is moved up and down (as indicated by vertical arrows) such that the cutter wheel 23 is moved toward/away from the glass plate 25. The air pressure in the air cylinder 22 presses the cutter wheel. 23 against the glass plate 25 to form a clutting or breaking line C on the glass plate 25.

Sliders 31 and 32 are attached to corresponding lower surfaces of the ends 5 and 6 of the bridge frame 4. The slider 31 is fitted slidable in the Y direction on a rail 34 which extends in the Y direction and is attached to a bed 33 on which the glass plate 25 is placed. The slider 32 is similarly fitted slidable in the Y direction on a rail 35 which extends in the Y direction and is attached to the bed 33. Thus, the bridge frame 4 is guidable on the rails 34 and 35 in the Y direction.

The ball screws 9 and 10 each are fixed at opposite ends to the bed 33 through supporting members 37. The ball screw nuts 7 and 8 screwed on the ball screws 9 and 10, respectively, have the same structure, so that only the ball screw nut 7 will be described below. Moving means are also provided for synchronously rotating nuts 7 and 8 to move frame 4 in the Y direction. Such moving means includes nut body 44 provided rotatably through balls 43 within a hollow cylindrical member 42 attached to the bridge frame 4 by bolts 41, and a multiplicity of steel balks 49 disposed successively within a spiral hole 48 communicating with both ends of holes 45 formed in the nut body 44, and formed by a screw i.e., a thread groove 46 communicating with both ends of the holes 45, a thread groove 46 in the ball screw 9, and a spiral groove 47 in the inner circumferential surface of the nut body 44. Rotation of the nut body 44 around the ball screw 9 moves in the Y direction the nut body 44 and hence the bridge frame 4 connected through the balls 43 and the cylindrical member 42 to the nut body 44. A toothed pulley 52 is fixed to the nut body 44 by bolts 51. A timing belt 53 extends around on a pulley 52. A toothed pulley 54 is fixed to the nut body (not shown) of the ball screw nut 8. A timing belt 55 extends around on a pulley 54.

Toothed pulleys 63 and 64 are fixed to the rotational output shafts of electric motors 61 and 62, respectively, of the Y direction linearly moving units 11 provided in the corresponding ends 5 and 6 of the bridge frame 4 with the timing belts 53 and 55 extending on the pulleys 63 and 64, respectively. Rotation of the shafts of the motors 61 and 62 dule to synchronous operation of those motors rotates the of ball screw nut 7 body 44 and the nut body of the ball screw nut 8 through the pulley 63, timing belt 53 and pulley 52 and through the pulley 64, timing belt 55 and pulley 54, respectively. Thus, both ends 5 and 6 of the bridge frame 4 are moved synchronously in the Y direction.

The X direction linearly moving unit 3 is provided with an electric motor 71 attached to a base 72 by bolts 73. A slider 75 is attached by bolts 74 to the base 72 to which a bracket 21 is also attached. The slider 75 is fitted over a rail 76 attached to a side of the bridge frame 4 so as to be movable in the X direction. Thus, the base 72 is movable in the X direction.

A first moving means is provided for moving the moving unit 3 and hence cutting head 2 in the X direction. Such first moving means includes a ball screw 12 fixed at opposite ends by support members 81 and 82 to an upper surface of the bridge frame 4. The ball screw nut 13 has the same configuration as the ball screw nuts 7 and 8. The nut body 83 screwed over the ball screw 12 is attached rotatably on the base 72. A timing belt 85 extends around a toothed pulley 84 fixed to the nut body 83 and also around a pulley 86 attached to the output shaft of the motor 71. When the motor 71 is operated and hence its rotational output shaft is rotated, the nut body 83 is rotated through the pulley 86, timing belt 85 and pulley 88. Thus, the base 72 and the cutter head 2 attached to the base 72 are moved in the X direction.

The motors 61, 62, 71 and the air pressure cylinder 22 each are connected to a numerical control unit 91 such that their operations are controlled by a program stored beforehand in the control unit 91.

The glass plate cutting device 1, thus constructed, operates as follows: The motors 61 and 62 are operated synchronously under the control of the control unit 91 such that the nut bodies of the ball screw nuts 7 and 8 and both ends 5 and 6 of the bridge frame 4 are moved synchronously in the Y direction. Simultaneously, the motor 71 is operated under the control of the control unit 91 to rotate the nut body of the ball screw nut 13 to thereby displace the base 72 in the X direction. The movement of the bridge frame 4 in the Y direction and the movement of the base 72 in the X direction causes the cutter head 2 to move along a cutting line C to be formed. When the cutter head 2 is moved to a position where the cutting line C is formed, the control unit 91 operates the air cylinder 22 to lower the cutter block 24 to thereby press the cutter wheel 23 against the glass plate 25. This forms the predetermined cutting line C on the glass plate 25 and corresponding to the configuration of the glass plate along which the glass plate is broken.

In the cutting device 1, the nut bodies of the ball screw nuts 7, 8 and 13 screwed over the long ball screws 9, 10 and 12 are rotated to move the bridge frame 4 in the Y direction and the base 72 in the X direction without rotating the screws 9, 10 and 12 to thereby move the cutter head 2 to a portion of the glass plate 25 to which the cutting line C is formed. Thus, the nut bodies of the nuts 7, 8 and 13 are easily rotated at high speed to thereby move the cutter head 2 at high speed. Since the nut bodies of the screws 7 and 8 are rotated synchronously, the cutter blade 23 is moved accurately.

Figure 4:
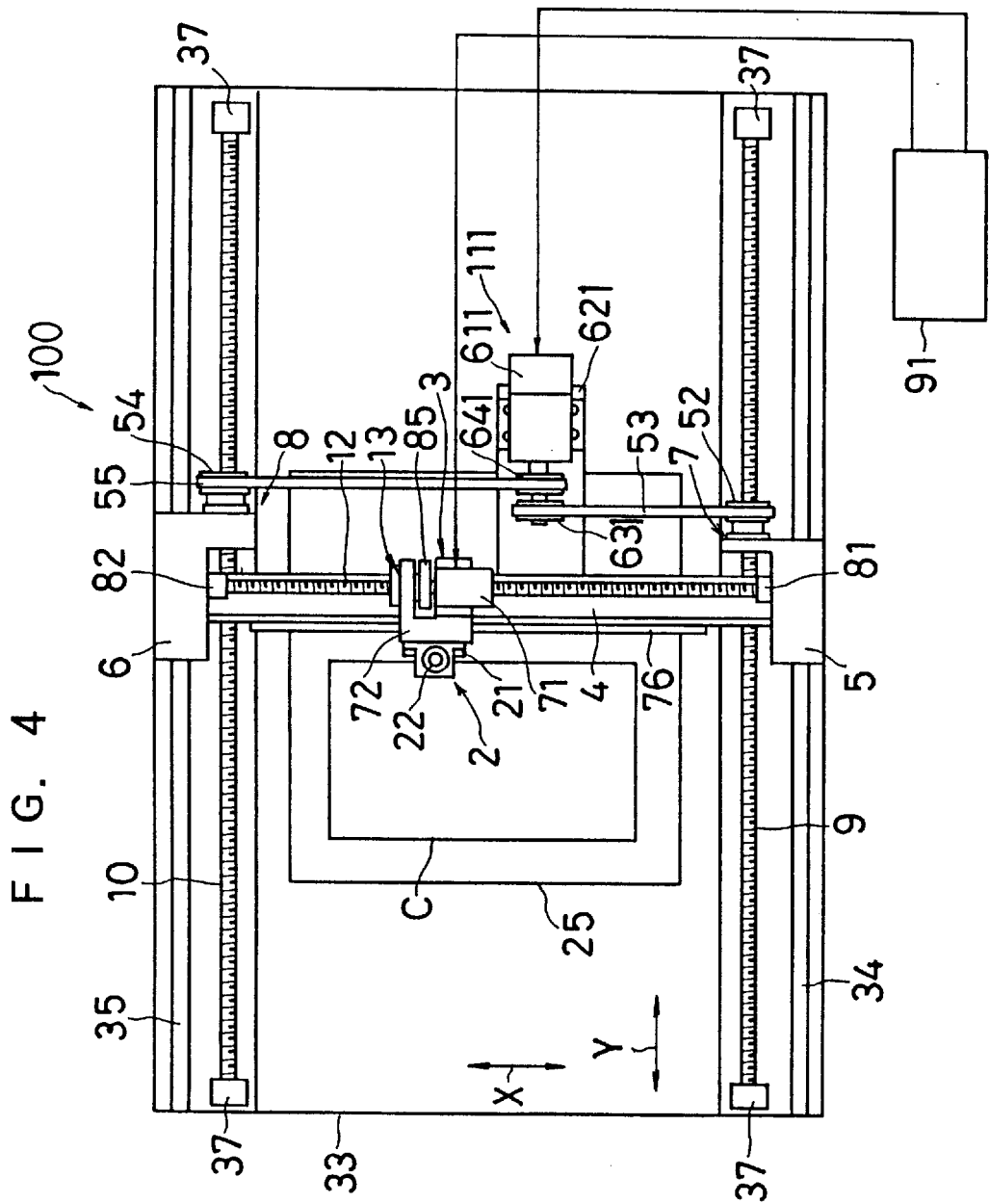
FIG. 4 is a plan view of another preferred embodiment of the present invention.

While in the cutting device 1 illustrated in FIG. 1 the two synchronously operated electric motors 61 and 62 compose the Y direction linearly moving unit 11, a common moving means for synchronously rotating in comma the ball screw nuts 7 and 8 is provided. For example, a Y direction linearly moving unit 111 common to both the nuts 7 and 8, as shown in FIGS. 4 and 5, may be provided to form a glass plate cutting device 100. The Y direction linearly moving unit 111 of FIGS. 4 and 5 is provided with an electric motor 611 attached through a bracket 621 to substantially the center of the bridge frame 4. Toothed pulleys 631 and 641 are fixed to the rotational output shaft of the motor 611. Timing belts 53 and 55 extend around the pulleys 631 and 641, respectively. The motor 611 is also connected to the control unit 91 such that it is controlled by a program stored beforehand in the storage of the control unit 91 in a manner similar to that used in the previous embodiment. When the motor 611 is operated to and its output shaft is rotated in the Y direction linearly moving unit 111, the nut body 44 is rotated through the pulley 631, timing belt 53 and pulley 52 while the body of the nut 8 is rotated through the pulley 641, timing belt 55 and pulley 54. Thus, the ends 5 and 6 of the bridge frame 4 are moved synchronously in the Y direction.

As described above, when the synchronous rotation of the bodies of the nuts 7 and 8 is made by the Y direction linearly moving unit 111 common to the nuts 7 and 8, that is, by the single motor 611 as In the present embodiment, strict selection of such electric motor for synchronous purposes, and much maintenance and adjustment of the electric circuit are not required, and maintenance and adjustment are simply made in a short time.

I claim:

1. A glass plate cutting device comprising:

an elongated bridge frame having opposite ends and supported at said opposite ends for movement in a Y direction, a cutter head mounted on said bridge frame for movement therewith and movable along said bridge frame in an X direction, said cutter head having a cutter wheel for forming a cutting line on a glass plate, and an air-pressing means for air-pressing said cutter wheel against the glass plate, first moving means for moving said cutter head along said frame linearly in the X direction, a pair of ball screw nuts each attached rotatably to a respective one of said opposite ends of the bridge frame, a pair of ball screws extending in the Y direction, each ball screw being screwed into each of the respective ball screw nuts, and second moving means for synchronously rotating said pair of ball screw nuts to move the bridge frame in the Y direction, the X and Y directions being orthogonally related and lying in a horizontal plane.

2. A glass plate cutting device according to claim 1, comprising a further ball screw extending in the X direction on the bridge frame, a further ball screw nut attached rotatably to the cutter head and screwed over the further ball screw, the further ball screw nut being rotated by the first moving means to move the cutter head in the X direction.

3. A glass plate cutting device comprising:

an elongated bridge frame supporting a cutter head mounted on said bridge frame for movement in an X direction, said bridge frame having opposite ends and being supported at said opposite ends for movement in a Y direction, said cutter head having a cutter wheel for forming a cutting line on a glass plate, and an air-pressing means for air-pressing said cutter wheel against the glass plate, a pair of ball screw nuts each attached rotatably to a respective one of said opposite ends of the bridge frame, a pair of ball screws extending in the Y direction, each ball screw being screwed in a respective one of the ball screw nuts, common moving means for synchronously rotating in common said pair of ball screw nuts to move the bridge frame in the Y direction, said moving means including a single motor disposed on said bridge frame, and transmitting means for transmitting to said pair of ball screw nuts a rotating force exerted by said single motor, and moving means for moving said cutter head linearly in the X direction, the X and Y directions being orthogonally related and lying in a horizontal plane.

4. A glass plate cutting device comprising:

an elongated bridge frame having opposite ends and supported at said opposite ends for movement in a Y direction, a cutter head mounted on said bridge frame for movement therewith and movable along said bridge frame in an X direction, said cutter head having a cutter wheel for forming a cutting line on a glass plate, and an air-pressing means for air-pressing the cutter wheel against the glass plate, first moving means for moving said cutter head linearly in the X direction, a pair of ball screw nuts each attached rotatably to a respective one of said opposite ends of the bridge frame, a pair of ball screws extending in the Y direction, each ball screw being screwed in a respective one of the ball screw nuts, and second moving means common to said pair of ball screw nuts for synchronously rotating said pair of ball screw nuts to move the bridge frame in the Y direction, the X and Y directions being orthogonally related and lying in a horizontal plane.

5. A glass plate cutting device according to claim 4, comprising a further ball screw extending in the X direction on the bridge frame, a further ball screw nut attached rotatably to the cutter head and screwed over the further ball screw, the further ball screw being rotated by the first moving means to move the cutter head linearly in the X direction.

6. A glass plate cutting device comprising a bridge frame which supports a cutter head and is supported at opposite ends thereof so as to be movable in a Y direction, said cutter head having a cutter wheel for forming a cutting line on a glass plate, and an air-pressing means for air-pressing the cutter wheel against the glass plate, a pair of ball screw nuts each attached rotatably to a respective one of the ends of the bridge frame, a pair of ball screws extending in the Y direction, each ball screw being screwed in a respective one of the nuts, and moving means common to both the ball screw nuts for rotating both the nuts to move the bridge frame in the Y direction, said moving means including a single motor disposed on said bridge frame, and transmitting means for transmitting to said both ball screw nuts a rotating force exerted by said single motor.

7. A glass plate cutting device comprising:

an elongated bridge frame having opposite ends and supported at said opposite ends for movement in a Y direction, a cutter head mounted on said bridge frame for movement therewith and movable along said bridge frame in an X direction, said cutter head having a cutter wheel for forming a cutting line on a glass plate, and an air-pressing means for air-pressing the cutter wheel against the glass plate, a ball screw nut attached rotatably to the cutter head, a ball screw extending the X direction on the bridge frame, and screwed in the ball screw nut, first moving means for rotating said ball screw nut to move said cutter head linearly in the X direction, and second moving means for moving the bridge frame in the Y direction, the X and Y directions being orthogonally related and lying in a horizontal plane.

8. A glass plate cutting device according to claim 7, comprising:

a pair of further ball screws extending in the Y direction, and a pair of further ball screw nuts each attached rotatably to a respective one of said ends of the bridge frame and screwed over a respective one of said further ball screws, the further ball screw nuts being synchronously rotated by the second moving means to move the bridge frame in the Y direction.

9. A glass plate cutting device according to claim 8, wherein, said second moving means is common to both the ball screw nuts for synchronously rotating both the nuts to move the bridge frame in the Y direction.

10. A glass plate cutting device comprising:

a cutter head for cutting a glass plate, an elongated bridge frame supporting said cutter head, said bridge frame having opposite ends and being supported at said opposite ends for movement in a Y direction, said cutter head being movable in an X direction on and along said bridge frame, said cutter head having a cutter wheel for forming a cutting line on a glass plate, and air-pressing means for air-pressing said cutter wheel against said glass plate, first moving means for moving said cutter head in said X direction, a pair of ball screw nut means attached rotatably to each end of said bridge frame, ball screw means extending the Y direction and being screwed into respective ball screw nut means, and second moving means for synchronously rotating said pair of ball screw nut means to move said bridge frame in the Y direction, the X and Y directions being orthogonally related and lying in a horizontal plane.

* * * * *

UNITED STATES PATENT AND TRADEMARK OFFICE
CERTIFICATE OF CORRECTION

PATENT NO. : 5,857,398

DATED : Janauary 12, 1999

INVENTOR(S) : Bando

It is certified that error appears in the above-identified patent and that said Letters Patent is hereby corrected as shown below:

On the title page, item [*] Notice: "5,398,575" should read -- 5,398,579 --

Claim 6 should read:

6. A glass plate cutting device comprising:

an elongated bridge frame having opposite ends and supported at opposite ends for movement in a Y direction, a cutter head mounted on said bridge frame for movement therewith and movable along said bridge frame in an X direction, said cutter head having a cutter wheel for forming a cutting line on a glass plate, and an air-pressing means for air-pressing the cutter wheel against the glass plate, a pair of ball screw nuts each attached rotatably to a respective one of said opposite ends of the bridge frame;

a pair of ball screws extending in the Y direction, each ball screw being screwed in a respective one of the nuts, moving means common to said pair of ball screw nuts for synchronously rotating said pair of ball screw nuts to move the bridge frame in the Y direction, said moving means including a single motor disposed on said bridge frame, and transmitting means for transmitting to said pair of ball screw nuts a rotating force exerted by said single motor, and

UNITED STATES PATENT AND TRADEMARK OFFICE
CERTIFICATE OF CORRECTION

PATENT NO. :5,857,398
DATED :January 12, 1999
INVENTOR(S) :Bando

It is certified that error appears in the above-identified patent and that said Letters Patent is hereby corrected as shown below:

moving means for moving said cutter head linearly in the X direction, the X and Y directions being orthogonally related and lying in a horizontal plane.

Signed and Sealed this

Seventeenth Day of August, 1999

Attest:

Q. TODD DICKINSON

*Attesting Officer*    *Acting Commissioner of Patents and Trademarks*